Nov. 11, 1930.    W. V. BROOKS    1,781,316
PLANT SUPPORT
Filed May 24, 1929
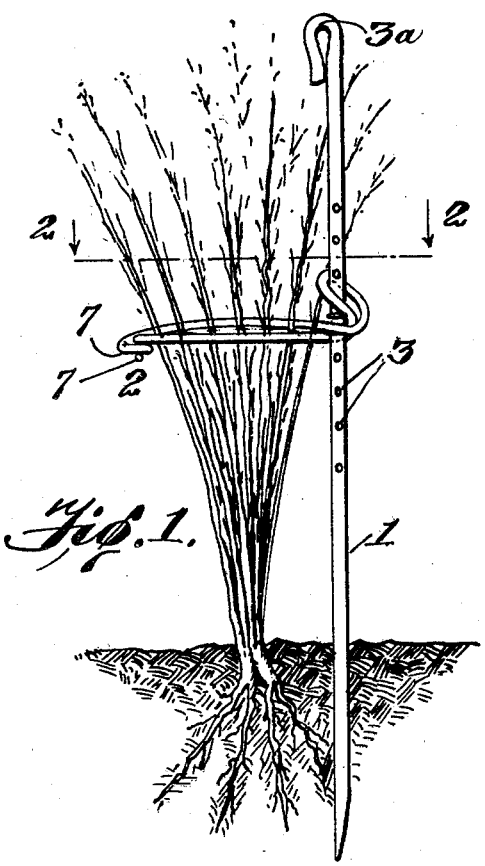
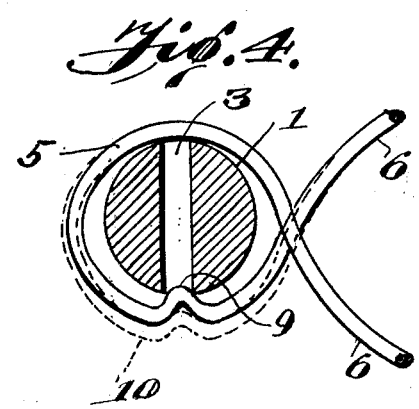
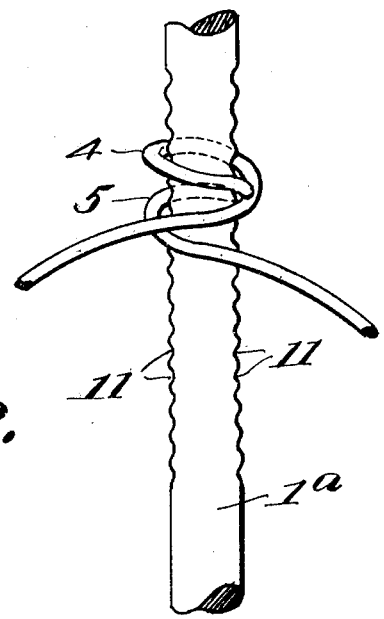
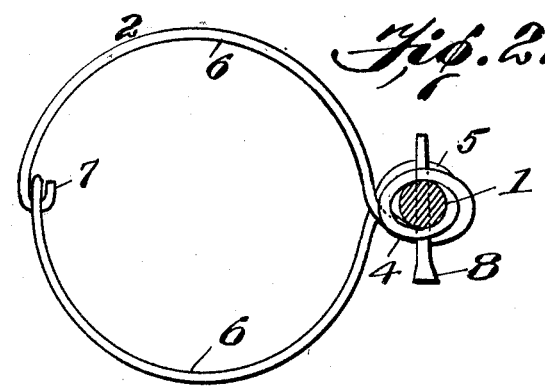
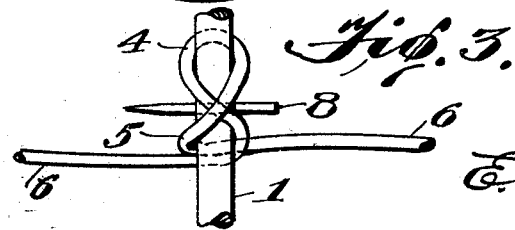
INVENTOR.
William V. Brooks
BY
E. E. Vrooman & Co.,
His ATTORNEYS.

Patented Nov. 11, 1930

1,781,316

UNITED STATES PATENT OFFICE

WILLIAM V. BROOKS, OF DES MOINES, IOWA

PLANT SUPPORT

Application filed May 24, 1929. Serial No. 365,728.

This invention relates to a plant support and has for its object the construction of a simple and efficient support that can be adjusted to meet the requirements of a growing plant, shrub or tree, so as to prevent the same from being easily run over by animals or persons or blown down or injured by storms and the like.

Another object of the invention is the construction of an adjustable plant support that fits the plant or shrub closely so as to give efficient and satisfactory results.

A still further object of the invention is the construction of the novel substantially X-shape double loop, whereby a clamping action is easily obtained upon the standard with a very simple and inexpensive device, that results in retaining the plant or shrub-enclosing device in an adjusted position upon the standard.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a view in side elevation of a device constructed in accordance with the present invention.

Figure 2 is a sectional view taken on line 2, 2, Figure 1, the plant or shrub being omitted.

Figure 3 is a fragmentary view, in elevation, looking at the rear of the device and showing the substantially X-shape double loop.

Figure 4 is an enlarged fragmentary sectional view of the device, showing another embodiment.

Figure 5 is a fragmentary view in front elevation of the device showing another embodiment of the standard.

Referring to the drawings by numerals, 1 designates the standard upon which is mounted the shrub-enclosing device 2. The standard 1 is preferably provided with a loop 3ª at its upper end, through which may be passed a string or cord that may be wrapped to a limb or part of the plant or shrub for assisting in further supporting the same. I preferably form a plurality of horizontal apertures 3 in standard 1 to obtain a greater adjustment of the plant-enclosing device 2, as will be more readily understood in the following description.

The plant-enclosing device 2 is formed from a single piece of springy wire (or band) and comprises a very simple substantially X-shape tiered double loop that includes the upper loop 4 and the lower loop 5; the outer ends of the lower loop 5 terminate in integral semi-circular jaws 6; these jaws constitute a plant band, and each jaw is provided at its outer end with a hook 7; these hooks 7 are adapted to interlock when in their normal position. The plant-encircling device can be easily placed around a plant or shrub by simply separating the hooks 7, so that the base of the plant can be passed between the outer ends of the jaw, while the plant-encircling device is in a vertical position, then the device is turned to a horizontal position as shown in Figure 1, then the device, with the standard 1 in the double loop, is slid or moved upward on the plant and the standard, until the jaws fits snugly around the plant; this sliding of the double loop upon the standard 1, for accurate adjustment on the plant or shrub, is better accomplished by pressing slightly inward upon the jaws, which slightly expands both of the loops, then when pressure is removed from the jaws, they will spring outwardly until the hooks 7 engage (Fig. 2), whereupon the diameter of the loops is sufficiently reduced to cause the peculiar X-shape double loop to bind or clamp the standard 1, which action in itself constitutes a sufficient lock upon the standard, to hold the plant-encircling device in a given position thereon, but to insure positive locking of the plant-encircling device upon the standard, when undue strain is placed upon the plant or shrub, such as during a storm or an animal striking the plant, I employ a pin 8, placing the same in an aperture 3 that happens to be between the upper and lower loops 4 and 5 respectively. It will be obvious that by having a plurality of apertures 3 in the standard, a very accurate placing of the pin 8 can be obtained, to suit any condition of adjustment, of the plant-enclosing device 2.

In the embodiment shown in Figure 4, an inwardly extending tit 9 is bent from the body of the lower loop 5, which tit, when the jaws are closed together (Figs. 1 and 2) will enter an aperture 3 and lock the plant-encircling device upon the standard without using the pin or removable fastening member 8. In Figure 4, dotted line 10 shows the action obtained by compressing the jaws 6 slightly together, to slightly increase the diameter of the loops, for ready adjustment upon the standard, as aforesaid.

In the embodiment shown in Figure 5, the standard 1ª is notched or grooved at 11, into which grooves fit the loops 4 and 5, which constitute a positive lock for retaining the plant-receiving device in any given adjusted position, for efficiently supporting the plant or shrub.

Upon studying enlarged Figures 4 and 5, it will be more readily seen that when jaws 6, 6 are slightly pressed together, the expanding action (dotted line 10) will take place on the loops 4 and 5, for it has been found that although the movement is small, it is however, sufficient to enlarge the loops to enable the same to freely slide upon the standard, but when manual pressure is removed off the jaws, contraction automatically takes place on the loops of this peculiar X-shape double loop structure that acts as a clamp or binding means for the encircling device, which efficiently supports said device upon the standard in an adjusted position, except that, in some cases, when undue strain is being exerted, said positive locking pin 8 may be desired in an aperture of the standard.

While I have described the preferred embodiments of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claims.

What I claim is:

1. A plant support, comprising a standard, and a plant-enclosing device upon said standard, said device comprising an expansible and contractible tiered double loop surrounding said standard, and plant surrounding jaws extending from one of said loops.

2. A plant support, comprising a tiered X-shape double expansible and contractible loop-structure, provided with plant surrounding jaws, and a standard extending through the loops.

3. A plant support comprising a pair of integral tiered circular loops, one of said loops provided within the circle with a horizontal tit extending inwardly from one side towards the other side, a standard extending through all of the loops and adapted to have said tit engage its side for assisting in holding the loops in a fixed position upon the standard, and plant engaging jaws extending outwardly from one of said loops.

4. A plant support, comprising a pair of tiered circular shape loops formed from a single piece of material and adapted to expand and contract uniformly, the lower loop being provided with a horizontal tit extending from one side towards the other side of the loop, a standard extending through all of the loops and engaged by said tit, and said lower loop provided with outwardly extending expansible and contractible jaws, substantially as shown and described.

In testimony whereof I hereunto affix my signature.

WILLIAM V. BROOKS.